United States Patent [19]

Brookey

[11] Patent Number: 5,007,140
[45] Date of Patent: Apr. 16, 1991

[54] SNAP-ON FASTENER

[76] Inventor: Charles D. Brookey, 11291 E. Broadway, Tucson, Ariz. 85748

[21] Appl. No.: 484,906

[22] Filed: Feb. 26, 1990

[51] Int. Cl.⁵ .................. F16G 11/00; A01K 91/04
[52] U.S. Cl. ............................... 24/129 R; 43/44.83
[58] Field of Search ............... 24/129 R, 129 A, 128, 24/130; 43/43.16, 44.83

[56] References Cited

U.S. PATENT DOCUMENTS

| | | | |
|---|---|---|---|
| 319,655 | 6/1885 | Wright | 43/44.83 |
| 2,151,609 | 3/1939 | Menderman | 24/129 R |
| 2,616,206 | 11/1952 | Ammon | 43/44.83 |
| 2,780,886 | 2/1957 | Rach | 43/44.83 |
| 3,210,883 | 10/1965 | Ulsh | 43/44.83 |
| 3,758,976 | 9/1973 | Szwolkon | 43/43.16 |
| 3,878,637 | 4/1975 | Flower | 43/44.83 |
| 3,988,852 | 11/1976 | Klein | 43/44.83 |

OTHER PUBLICATIONS

Rumpf & Son Catalog, 1989, p. 144.
Mustad Fish Hooks Catalog, p. 35.
Orvis 1990 Spring Catalog, p. 33.

*Primary Examiner*—Victor N. Sakran
*Attorney, Agent, or Firm*—Antonio R. Durando; Harry M. Weiss

[57] ABSTRACT

A new fastener to attach a line to a hook. A knob shaped device is tied to the end of the line and it is snapped tight into the eye of the hook, thus providing the fastening connection. It functions by sliding the line through an opening in the structure forming the eye of the hook and then by pulling the line to snap the retaining knob into the eye. The knob provides both a stop to the sliding of the line within the eye and a connection to the hook.

8 Claims, 1 Drawing Sheet

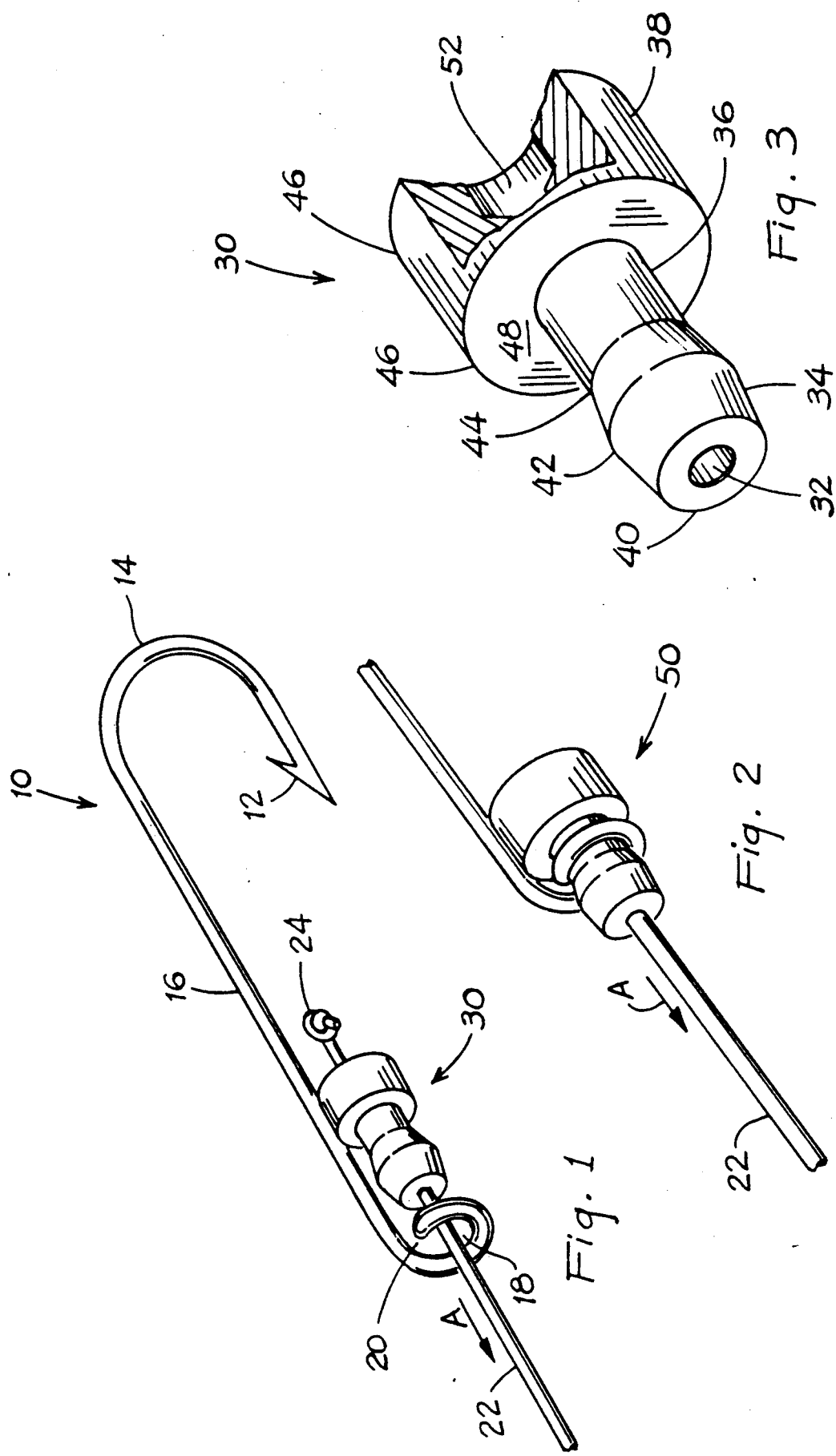

SNAP-ON FASTENER

BACKGROUND OF THE INVENTION

1. Field of the Invention

This invention pertains to the general field of fasteners and connectors. In particular, it provides a new and improved way of connecting the end of a line, such as in fishing or hoisting, to a hook-type device for holding material.

2. Description of the Prior Art

The invention can be applied in similar fashion to any environment requiring the connection of a hook-type holding device to the end of a line. Thus, it pertains to the entire range of application of such connectors, from heavy duty hoists to minute fishing hooks.

The common way of securing material to a line for lifting or other purposes is to hang it on a hook at the end of the line. The connection between the hook and the line varies greatly with the application, but it usually involves a system that permits the separation of the hook from the line when necessary for the efficient performance of a given task. When dealing with a hoist, the hook is normally kept in place by a removable bolt that secures the eye of the hook to a pulley attached to the line. Therefore, mechanical labor is required to separate the hook from the pulley.

Similarly, fishing hooks are connected by wire snaps that are attached to the fishing line, either directly or through leaders, and that are inserted through the eye of the hook. These connections are proven and reliable, but have some drawbacks that this invention is addressing.

With reference to fishing hooks and snaps or other attachments, to which the preferred embodiment of this invention is directed, all prior art describes different means for inserting a wire into the eye of the hook and then locking it in place. For example, the 1989 Raymond C. Rumpf & Son Catalog on page 144 shows a so called cross-lok snap consisting of a wire looped and latched at each end to form a double safety pin type of device. One end is used to secure the fish hook through its eye, while the other end is used to connect the assembly to a swivel or similar attachment to the fishing line. The result is a cumbersome and voluminous combination of different pieces, whose only purpose is to fasten the fish hook to the line. The fish bait or lure, which is normally wrapped around and covers only the hook, is thus often overshadowed by the hardware, affecting its intended purpose and effectiveness by distorting its action and appearance in the water. This drawback is particularly significant in fly fishing, where the artificial fly is meant to be the centerpiece and ideally the only visible part of the hook assembly.

Another common fastener is the snap swivel, which combines the safety pin type of device, called safety snap, used to thread and secure the eye of the hook, with a swivel mechanism attached to the line. A variety of such devices is shown on page 144 of the Rumpf catalog referenced above. All of these fasteners are relatively bulky and cause an unrealistic lure or fly behavior. Another problem associated with this type of fastener is the cumbersome and time consuming process of changing hooks. The snap has to be unlatched and worked loose from the eye of the hook, followed by the reverse operation to fasten it to a new hook. This sequence of movements requires dexterity and good vision, attributes that are often not enjoyed by fishermen under the outdoor conditions in which they practice the sport.

In order to simplify and accelerate the process of changing bait hooks, so called snap hooks have been developed. See, for example, the Mustad Fish Hooks Catalog on page 35 and the Orvis 1990 Spring Fishing Catalog on page 33. These snap hooks are shaped like a regular hook with a looped bend to create a narrow gap between the point and the shank. The eye of the snap is tied directly to the line or to a leader. The point of the snap is inserted into the eye of the bait hook, or of the fly or lure, which is snapped and kept in place by the narrow gap in the snap hook.

The snap hook makes it easier for fishermen to change fish hooks, but it does not solve the problem created by the presence of relatively large hardware, whose only purpose is the fastening of the hook to the line. In order to avoid this problem, fishermen often tie the bait hook directly to the line or to a leader which is then secured to the line by some means equivalent to the ones just described. In the former case, the bait hook can only be changed by untying the line and retying it to a new hook, at considerable expense of time and effort. In the latter case, the hook becomes part of the leader itself, as shown on page 43 of Mustad's catalog, so that a change of hook involves a change of leader also, with the corresponding storage complications and additional costs for fishing gear. Moreover, the hardware used to tie the leader is the same as used to tie bait hooks, so that the same awkward maneuvers are necessary when changing leaders.

It is the purpose of this invention to address and solve the problems mentioned above. Accordingly, a new device has been developed that performs the functions of the fasteners described above but is very small relative to the size of the bait hook it secures and is, therefore, virtually invisible when attached to it. In addition, this invention provides a new method of attachment whereby the line can be fastened to the bait hook by a simple motion that does not involve any opening and closing of a latch or equivalent mechanism. Therefore, by virtue of this invention fishermen are able to change hooks, flies and lures very quickly and without any action that requires good dexterity or vision.

BRIEF SUMMARY OF THE INVENTION

This invention consists of a new fastener to attach a line to a hook. A knob shaped device is tied to the end of the line and it is snapped tight into the eye of the hook, thus providing the fastening connection. It functions by sliding the line through an opening in the structure forming the eye of the hook and then by pulling the line to snap the retaining knob into the eye. The knob provides both a stop to the sliding of the line within the eye and a connection to the hook.

One objective of the invention is the reduction in the size of the item fastening the line to the hook in relation to the size of the hook itself. This characteristic is very important in the case of fishing gear because a fisherman's success depends in part on the appearance of the bait in the water. Since the desirable goal is the use of a fishing hook that is completely hidden in the bait, the preferred hardware for attaching the hook to the line must necessarily be small in order to decrease its visibility.

Another objective of the invention is the simplification of the steps required to change hooks in order to render the process more manageable under all circumstances and faster when time is of the essence. This is achieved by providing a snap-on connection between the line and the hook.

A further objective of this invention is the realization of the above mentioned goals in an economical and commercially viable manner. This is done by utilizing simple components that are either already available in the open market or can be produced at competitive prices.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 illustrates a fishing line inserted through the open slit in the eye structure of a bait hook and the snap-on fastener tied to the end, of the line.

FIG. 2 illustrates the same components of FIG. 1 after the fastener has been snapped in place in the eye of the bait hook.

FIG. 3 shows an enlarged view of the fastener to illustrate its functional components and their relative dimensions.

DETAILED DESCRIPTION OF THE INVENTION

The substance of this invention lies in the idea that a device for fastening a line to a hook that operates by snapping a stop attached to the line directly to the eye of the hook would greatly simplify the process of changing hooks. In addition, because the dimensions of such device would be of the same relative size of the eye of the hook, this invention would also reduce the overall size and therefore improve the operational performance of the assembly.

Although the invention was conceived in the context of fishing to improve the efficiency and effectiveness of the gear currently in use, the same principles can apply to any situation requiring the attachment of a line to a hook. For clarity of illustration, the invention is specified in terms of fishing equipment.

Referring to FIGS. 1, 2 and 3, a particular embodiment of this invention is shown. While only one of many ways to effect the same result, the apparatus in these figures is believed to be the best example for practicing the invention in an economical and operationally efficient way. FIG. 1 illustrates a fishing hook 10 consisting of all components of a generic hook, including a point 12, a bend 14, a shank 16, and an eye 18. Differently from all hooks used today, the eye 18 of this hook is not completely enclosed. Rather, it has an opening 20 created by the incomplete looping of the structure that constitutes the eye. This opening 20 needs to be large enough to allow the free passage of the fishing line 22 in and out of the eye. A larger opening would decrease the structural strength of the eye and it is, therefore, not recommended. Moreover, while the eye of a generic hook may or may not be circular, the eye 18 of this invention, as specified in this embodiment, is required to be round.

The knob-like device 30 is a separate component of the invention that functions in cooperation with the line 22 and the hook's eye 18. Referring to both FIGS. 1 and 3, this device is perforated along its longitudinal axis to provide a hole 32 through which the fishing line 22 can be threaded and secured by a stopper knot 24. The diameter of the opening 32 is uniform along the main portion of the body of the device 30 and is sufficiently large to permit the free insertion of the line 22, but small enough to cause the knot 24 to catch and be retained as the line slides out of the device.

As illustrated in FIG. 3, said device 30 consists of three functionally distinct parts. Shown along the device's main axis, they are a knob 34, a neck 36, and a stop 38. The function of the knob 34 is to snap into the eye 18 when forcibly pulled by the fishing line 22 in the direction indicated by arrow A in FIG. 1. For the knob to operate properly, its circumference 40 at the tip of the device 30 must be smaller than the circumference of the opening created by eye 18, so that the knob can be easily engaged in the eye by the pulling of line 22. At the same time, the circumference of knob 34 is tapered increasingly to its largest point 42, where it must be slightly larger than the eye opening, so that it will snap into it under pull but will not slide out of it when the pulling force ceases. Between points 42 and 44 the circumference of knob 34 is tapered decreasingly to permit the knob to snap out of the eye opening by pulling in the opposite direction. Of course, the elasticity of the materials used in the construction of the knob 34 and of the eye 18, as well as their relative sizes, will determine the ease with which the knob will snap through the eye for a given pulling force.

The neck 36 constitutes the center portion of the device and is the structure on which the eye 18 rests after the device has been snapped in place, as illustrated in FIG. 2. Therefore, the circumference of the neck remains constant from its point of transition 44, where the two structures join as integral parts of a single body, and it is the same as that at point 40, The function of the neck is to provide a groove for the hook's eye to snap into.

Finally, the stop 38 is provided to prevent the device 30 from sliding out of the eye 18 as a result of pulling on line 22. The stop is shown in cylindrical shape in this embodiment for simplicity, but such shape is not a functional requirement of the invention. So long as the stop's diameter is large enough to prevent its passage through the eye of the hook under the largest pulling force for which it is designed, it will provide the stop function required by the invention. At its largest point, shown as the cylinder's circumference 46 in FIG. 3, the stop should still be able to clear the shank 16 of the hook while being pulled into the eye 18, so that the device 30 and the eye 18 can cooperate smoothly in forming the working assembly 50 shown in FIG. 2.

Although not necessary, it is found that the inside face 48 of the stop functions more efficiently when it comprises a flat surface perpendicular to the main axis of the stop, as shown in FIG. 3. Any other shape would provide less resistance to a force pulling the line and, therefore, it would work less efficiently as a stop. Similarly, though not essential to the proper functioning of the apparatus, the device in FIG. 3 shows a receptacle 52 recessed from the outside face of the stop 38. Its purpose is to provide a snug housing for knot 24 in the line, thus hiding it and keeping the line from sliding loosely.

The entire device 30 can be manufactured as a single unit machined to size in the appropriate proportions of the knob, neck and stop components, or it can be assembled by welding or otherwise attaching the individually manufactured components. The material used can be any that has the characteristics of resilience and strength required for withstanding the wear from its repeated snapping and unsnapping from hook eyes and from strenuous pulling of the fishing line.

The use of this invention is apparent from FIGS. 1 and 2. Once the line 22 is threaded through the device 30 and a knot 24 is tied to prevent the line from sliding out of it, the device is in place to provide attachment of the line to any hook of the appropriate size. All that needs to be done is to slide the line 22 through the opening 20 in the eye of the hook and to pull the line to force the knob 34 to snap into the eye. Once that is accomplished, the assembly is ready for use. To change a hook, the assembly can be taken apart by pulling on the stop 38 to cause the knob 34 to snap out of the eye, thus allowing the line to freely slide out through the opening 20. Both operations involve very simple steps that can be performed without the necessity of a particularly steady hand or good vision. In fact, because the line can be inserted into the eye by sliding it along the shank of the hook, the maneuver can be accomplished even in the dark by feeling the relative position of the parts.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatuses and methods.

I claim:

1. A fastener for an eye and line combination, comprising:
    (a) an eye, wherein an opening in the rim constituting said eye is provided for inserting said line into said eye; and
    (b) a stopper of size suitable for mechanical coupling and cooperation with said eye, said stopper having a hole capable of receiving said line and of preventing a knot tied on it from sliding through it, having a groove for receiving and holding in place the inside perimeter of said eye, and further having a stop to prevent said stopper from sliding out of said eye when a pulling force is applied to said line, said stop consisting of an enlarged end portion of said stopper.

2. The fastener described in claim 1, wherein said stopper is made of a resilient plastic material.

3. A method for fastening fishing hooks to a line, comprising the steps of:
    (a) providing a fishing hook wherein the structural loop constituting the eye of said hook is not completely enclosed against the shank of said hook, the corresponding aperture in said eye therefore providing an opening for inserting said line into said eye;
    (b) providing an oblong stopper of size suitable for mechanical coupling along its main axis with said eye of said hook, said stopper having a longitudinal perforation capable of receiving said line and of preventing a knot tied on it from being released through said perforation and having a recessed receptacle at one end for housing said knot, said stopper further comprising along its main axis a generally cylindrical stop section at the end adjacent to said knot, an intermediate cylindrical neck section and a generally oval knob section at the opposite end, wherein said stop section is sufficiently large to prevent its passage through said eye of said hook by a force applied to said line, said neck section is slightly smaller in diameter than said eye and is therefore capable of receiving it in snug connection, and said knob section varies in diameter from slightly smaller to slightly larger than said eye of said hook, so that it can be pulled through by a slight force applied to said line to cause said stopper to be snapped into said eye of said hook for mechanical fastening;
    (c) passing said line through said aperture in said eye; and
    (d) pulling on said line to cause said stopper to engage and snap into said eye.

4. The method described in claim 3, wherein said stopper is made of a resilient plastic material.

5. The method described in claim 3, wherein said fishing hook is dressed with a fly.

6. The method described in claim 5, wherein said stopper is made of a resilient plastic material.

7. The method described in claim 3, wherein said fishing hook is a lure containing an eye.

8. The method described in claim 7, wherein said stopper is made of a resilient plastic material.

* * * * *